Jan. 31, 1961 W. SCHWARTZ 2,969,943
FLIGHT VEHICLE CONTROL SYSTEM
Filed Nov. 28, 1958 2 Sheets-Sheet 1

WALTER SCHWARTZ
INVENTOR.

BY
ATTORNEY

Jan. 31, 1961  W. SCHWARTZ  2,969,943
FLIGHT VEHICLE CONTROL SYSTEM
Filed Nov. 28, 1958  2 Sheets-Sheet 2

WALTER SCHWARTZ
INVENTOR.

BY
ATTORNEY

United States Patent Office 2,969,943
Patented Jan. 31, 1961

2,969,943
FLIGHT VEHICLE CONTROL SYSTEM

Walter Schwartz, Torrance, Calif., assignor to Thompson Ramo Wooldridge Inc., Hawthorne, Calif., a corporation of Ohio Filed Nov. 28, 1958, Ser. No. 776,792

16 Claims. (Cl. 244—77)

This invention relates to flight vehicle control systems and more particularly to a system for controlling the flight path of a vehicle as a function of changes in the angle of downwash trailing a surface of the vehicle.

The relationship between the direction of air flow past a flight vehicle in motion and the attitude of an aerodynamic surface of the flight vehicle is known as the angle of attack. The angle of attack is frequently measured by placing a transducer in the form of a wind vane or differential pressure measuring devices forward of the aerodynamic surface in the direction of movement of the flight vehicle to determine the angle between the relative wind and the horizontal aerodynamic surfaces. For a conventional air foil, angle of attack is sometimes defined as the angle between the relative wind and the "no-lift line" of the air foil. In aviation practice, angle of attack is usually measured as the angle subtended by the wing chord and the relative wind.

It should be understood that relative wind is not caused by the air's motion past the flight vehicle, but by the flight vehicle's motion through the air. That is, the relative wind (wind of flight) always comes at the flight vehicle from the direction towards which the flight vehicle is moving, regardless of its attitude. Therefore, if the path of the flight vehicle is horizontal, the relative wind travels in a horizontal direction, but if the flight vehicle moves along a sloping flight path, even though the flight vehicle is in a level position, relative wind blows from the direction toward which the flight vehicle is moving along the sloping flight path.

It is well known that the air flow trailing an aerodynamic surface of a flight vehicle is deflected downwardly relative to the angle of attack. The deflected air flow is referred to as the downwash and the downwash angle is the angle of deflection. A detailed discussion of the downwash effect may be found in "Design Charts for Predicting Downwash Angles and Wake Characteristics Behind Plane and Flat Wings," by Abe Silverstein and S. Katzoff, Report No. 648 of the National Advisory Committee for Aeronautics, published by the Superintendent of Documents, Washington, D.C.

In automatic flight control systems, many of the operational characteristics of a flight vehicle are fed into an autopilot to maintain a desired flight path. One such operational characteristic is the altitude of a flight vehicle above ground level. While conventional barometric altimeters operate satisfactorily to measure altitude under most circumstances, when a flight vehicle is in proximity to the ground, known types of barometric altimeters do not possess sufficient accuracy and stability to allow for automatic control of the path of a flight vehicle. Accordingly, during a landing approach in a conventional aircraft, the flight path is under the manual control of the pilot. Particularly in the portion of a landing approach in which an aircraft follows a flared out path in the transition between a straight line descent and touchdown, a limitation on the automatic control of the flight path has been the lack of a suitable low altitude measuring instrument by means of which the height of the vehicle above ground may be determined accurately.

An example of another condition in which the operational characteristics of a flight vehicle have not been subject to sufficiently accurate measurement to enable automatic control of the flight path includes the transition which occurs when a flight vehicle passes from a velocity less than the speed of sound to a velocity in excess of the speed of sound and vice versa.

An operational characteristic of a flight vehicle which has not heretofore been used to advantage is the relationship between the angle of attack and the downwash angle where changes in the downwash angle occur as a result of discontinuities in the air stream or ground effects. For example, it is well known that where an aerodynamic surface is moving through the air in proximity to the ground, the flow of air trailing the aerodynamic surface is altered so as to reduce the downwash angle as a function of the height of the aerodynamic surface above ground. A detailed discussion of the ground effect on the air trailing an aerodynamic surface may be found in "Ground Effect on Downwash Angles and Wake Locations," Report 738, National Advisory Committee for Aeronautics, published by the Superintendent of Documents, Washington, D.C. In addition, the downwash angle may be affected during the transition which occurs when a flight vehicle passes through the speed of sound.

Although the above described effects associated with the downwash trailing a surface of a flight vehicle have been measured and described in detail, there has heretofore been no known useful application of variations occurring in the downwash angle. Accordingly, it is a principal object of the present invention to provide a new and improved system for measuring the operational characteristics of a flight vehicle associated with changes in the downwash angle.

It is another object of the present invention to provide a new and improved flight path control system for controlling the path of a flight vehicle in response to changes in the downwash trailing an aerodynamic surface.

It is a further object of the present invention to provide a new and improved low altitude measuring system for determining the height of a flight vehicle above ground.

It is yet another object of the present invention to provide a new and improved flight control system in which the path of a flight vehicle making a landing approach is automatically controlled as a function of changes in the angle of the downwash trailing an aerodynamic surface.

In accordance with one aspect of the invention for use in conjunction with a flight vehicle in which a moving surface engages a fluid medium, the angle of attack of the surface is sensed, the angle of the downwash trailing the surface is sensed, and the flight path of the vehicle is determined in accordance with a given relationship between the angle of attack and the downwash angle.

In accordance with another aspect of the invention, there is provided an altitude measuring system for use in conjunction with a flight vehicle in which the angle of attack of a moving surface is sensed, the angle of the downwash trailing a surface of the flight vehicle is sensed, and the height of the flight vehicle above ground is determined through a given relationship between the angle of attack and the downwash angle.

In accordance with one particular application of the invention, for use in the control of an airborne flight vehicle during a landing approach, a first transducer is positioned forward of an aerodynamic surface of the flight vehicle for determining the angle of attack, a second transducer is positioned trailing an aerodynamic surface of the flight vehicle for determining the downwash angle, and a control surface of the flight vehicle is positioned in accordance with a given relationship between the angle of attack and the downwash angle to cause the flight vehicle to follow a flared out path in its approach to ground.

In another particular application of the invention, for use in stabilizing an airborne flight vehicle passing from speeds below the speed of sound to speeds above the speed of sound, the change in the downwash angle trailing an aerodynamic surface of the flight vehicle is sensed to alter the control surfaces of the flight vehicle to compensate for differences in the operational characteristics of the flight vehicle for speeds above and below the speed of sound.

In still another particular application of the invention for use in the control of a flight vehicle such as a submarine or torpedo, the angle of attack of a surface relative to a fluid is sensed, the angle of downwash of fluid trailing a surface is sensed, and the path of the vehicle is determined through a given relationship between the angle of attack and the downwash angle.

A better understanding of the invention may be had from a reading of the following detailed description and an inspection of the drawings, in which.

In the investigation of aerodynamic and hydrodynamic surfaces, it has been found that the flow of air or fluid trailing a moving surface is deflected through an angle referred to as the downwash angle which depends on the flight conditions and characteristics of the surface. For example, for first order estimates of the angle of the downwash trailing a conventional air foil, the following relationship exists:

$$\epsilon = \frac{114.6 C_l}{\pi A}$$

where $\epsilon$ equals the downwash angle in degrees, $C_l$ equals the lift coefficient of the air foil, and $A$ equals the wing aspect ratio of the air foil.

In further investigation, it has been found that the variation of the downwash angle with the angle of attack is as follows:

$$D_\epsilon/d\alpha = \frac{114.6}{\pi A} A W$$

where $A_W$ equals the slope of the lift curve of the air foil $$\left(\frac{dC_l}{d\alpha}\right)$$

and $\alpha$ equals the angle of attack.

The above relationships are general and applicable to the case of an aerodynamic surface in free flight. However, when an aerodynamic or hydrodynamic surface passes through air or fluid in relatively close proximity to the ground, the air or fluid trailing the aerodynamic surface is acted upon by the ground and deflected in such a manner that the above relationships no longer apply. To illustrate, if an aerodynamic surface was directly on the ground plane, the air trailing the aerodynamic surface would not be deflected but constrained by the ground plane and the downwash angle would be equal to zero. Investigations of the effect of the proximity of the ground on the angle of the downwash trailing an aerodynamic surface indicate that the downwash angle changes in a predictable manner as a function of the distance of the aerodynamic surface above the ground.

Figure 1A:
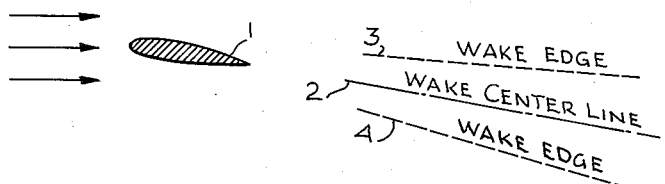
Fig. 1 is a pair of diagrammatic illustrations of the relationship between a moving aerodynamic surface and a trailing downwash.
Figure 1B:
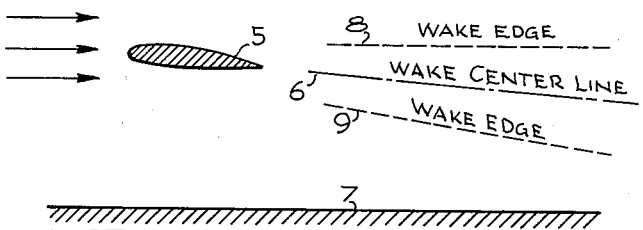

In Fig. 1(a), there is illustrated diagrammatically an aerodynamic surface 1 in motion through the air. The air trailing the aerodynamic surface 1 is deflected downwardly as illustrated by the wake center line 2 with the boundaries of the deflected air flow being indicated by the dashed wake edge lines 3 and 4. In a similar fashion, Fig. 1(b) illustrates diagrammatically an air foil 5 in motion through the air with the center line 6 of the trailing downwash indicating that the presence of the ground 7 reduces the downwash angle as compared to the air foil of Fig. 1(a) in free flight. As illustrated in Fig. 1(b), the boundary edges 8 and 9 of the trailing air flow are likewise affected by the presence of the ground 7.

Figure 2:
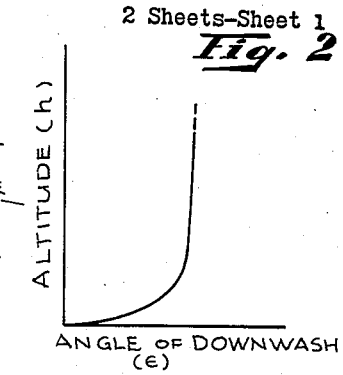
Fig. 2 is a graphical illustration of the relationship between the altitude of an aerodynamic surface and the angle of downwash.

The variation in the angle of downwash $\epsilon$ with altitude ($h$), assuming a constant angle of attack $\alpha$, is illustrated in Fig. 2. As indicated in Fig. 2, the downwash angle approaches a constant value as the altitude increases to the point where the ground plane no longer holds any constraints on the deflected downwash. It has been found that the effect of the proximity of the ground on the downwash angle may be readily detected at heights of the flight vehicle above ground of the order of semi-span of the wing so as to provide an accurate low altitude altimeter or flight path control system as described in detail below.

Since the angle of attack $\alpha$ is also affected by the ground, a true measure of the height of a flight vehicle above the ground can be obtained by measurement of the derivative of the downwash angle with respect to the angle of attack $$\left(\frac{d\epsilon}{d\alpha}\right)$$

Figure 3:
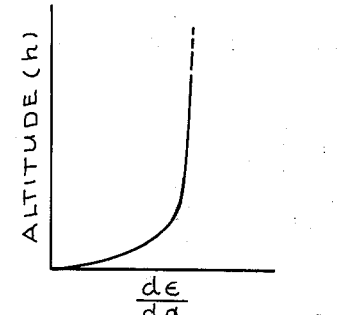
Fig. 3 is a graphical illustration of the relationship between the altitude of a moving aerodynamic surface and the derivative of the downwash angle with respect to the angle of attack.

This relationship is illustrated in Fig. 3 in which it is apparent that the derivative of the downwash angle $\epsilon$ with respect to the angle of attack $\alpha$ approaches a constant value as the altitude increases in a manner substantially similar to the manner in which the downwash angle varies with altitude as illustrated in Fig. 2. Since the angle of attack of an aerodynamic surface in flight may vary in accordance with the attitude of the flight vehicle with respect to the relative wind, a true indication of the height of a flight vehicle above ground at low altitudes may be derived from a comparison of the angle of attack and the downwash angle where the ground effect is present.

While Figs. 2 and 3 indicate that the downwash angle and the derivative of the downwash angle with respect to the angle of attack remain substantially constant when the flight vehicle is free of the ground effect, other discontinuities in the air stream may lead to a measurable change in the downwash angle which may be used to advantage as a measure of the operational characteristics of a flight vehicle.

For example, it is known that the rate of change of downwash angle with angle of attack changes rather rapidly with Mach number as transonic speeds are approached. Under ordinary circumstances, it is generally necessary to readjust the control surfaces of an aircraft to maintain a desired flight path to prevent violent pitchup or tuck-under motions which occur when a flight vehicle passes through its critical Mach number.

Figure 4:
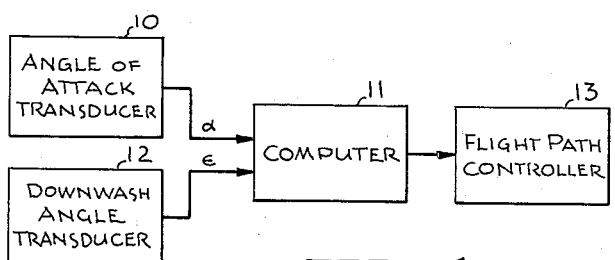
Fig. 4 is a block diagram of a flight vehicle control system in accordance with the invention.

Fig. 4 is a block diagram illustrating a generalized flight path control system in which the operational characteristics of a flight vehicle arising from changes in the angle of attack and the downwash angle may be used to control the flight path. In Fig. 4, an angle of attack transducer 10 mounted in a position on a flight vehicle to sense the relationship between the attitude of an aerodynamic surface and the relative wind produces a signal representing the angle of attack $\alpha$ which may be applied to a computer 11. In a similar fashion, a downwash angle transducer 12 may be mounted in a position trailing an aerodynamic surface of a flight vehicle to generate a signal corresponding to the downwash angle $\epsilon$ which is applied to the computer 11. The computer 11 functions to compare the signals from the angle of attack transducer 10 and the downwash transducer 12, and to generate a suitable signal in accordance with the comparison representing the operational characteristics of the flight vehicle for application to a flight path controller 13.

Where the variation in the downwash angle produced by the ground effect is to be employed in the system of Fig. 4, for controlling the path of the flight vehicle during a landing approach, the computer 11 and the flight path controller 13 may be arranged to cause the flight vehicle to follow a suitable path in its approach to ground. Where a discontinuity in the air stream occurs to produce a variation in the downwash angle associated with the passage of a flight vehicle through a critical speed, the computer 11 and the flight path controller 13 are arranged to reposition the control surfaces of a flight vehicle to follow a desired flight path unaffected by the critical speed transition.

Since the structure of suitable computers and flight path controllers is well known, it is believed that no detailed description of specific mechanisms for these devices is necessary. However, Fig. 5 is given as an example of one system is which the principles of the invention may be employed to provide a low altitude measuring system and control of the landing approach of a flight vehicle such as a conventional aircraft.

Figure 5:
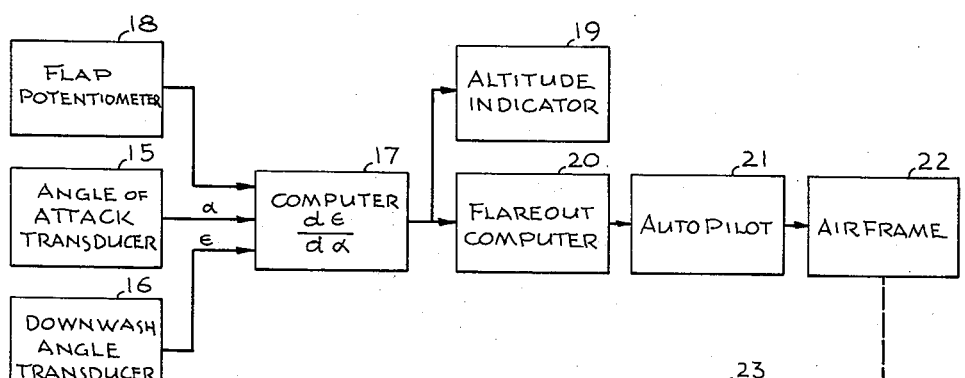
Fig. 5 is a block diagram of a flight vehicle control system in accordance with the invention for use in connection with the automatic landing of a flight vehicle.

The flight path control system of Fig. 5 includes an angle of attack transducer 15 which may be mounted in a position forward of an aerodynamic surface of a flight vehicle to measure the angle of attack. Similarly, a downwash angle transducer 16 may be mounted in a position trailing an aerodynamic surface of a flight vehicle to measure the angle of the downwash. Signals derived from the angle of attack transducer 15 and the downwash transducer 16 may be applied to a computer 17 for generating a signal corresponding to the derivative of the downwash angle with respect to the angle of attack $$\left(\frac{d\epsilon}{d\alpha}\right)$$

In a conventional aircraft in which flaps are employed on the wing to alter the lift coefficient during landing and take-off, the position of the flap has an effect upon the angle of the downwash trailing the wing. Accordingly, where flaps are employed on the aerodynamic surfaces producing the downwash which is measured by the downwash angle transducer 16, a flap potentiometer 18 may be linked to the flap control mechanism to generate a signal corresponding to the position of the flap. By applying a signal from the flap potentiometer 18 to the computer 17, a suitable correction may be made for the flap position and its effect upon the downwash angle. As described in detail above, the derivative of the downwash angle with respect to the angle of attack $$\left(\frac{d\epsilon}{d\alpha}\right)$$

varies in a predictable fashion with respect to the altitude of the flight vehicle above ground at low altitudes. Accordingly, the signal from the computer 17 may be applied to an altitude indicator 19 to display the height of the flight vehicle above ground at low altitudes. By referring to the altitude indicator 19, the pilot of a flight vehicle may make suitable corrections during a landing approach to cause the flight vehicle to follow a desired flight path.

Figure 6:
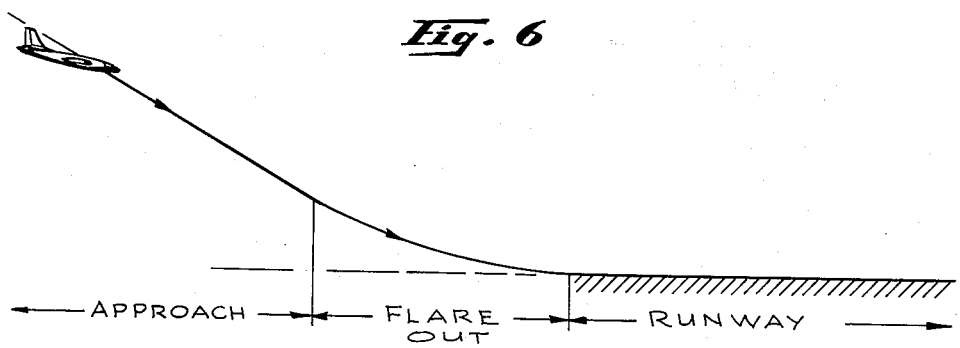
Fig. 6 is a diagrammatic illustration of the flight path of an aircraft making a landing approach.

In general, conventional aircraft in making a landing approach are directed towards a landing runway along a straight line sloping glide path as illustrated in Fig. 6. At the terminal end of the glide path, just prior to touchdown, the flight vehicle is generally caused to follow a flared-out path in a transition between the straight line sloping glide path and the plane of the runway. In addition to the altitude measuring system described above, the apparatus of Fig. 5 includes an arrangement for automatically controlling the path of a flight vehicle during the flared-out transition at the terminal end of a landing approach.

In Fig. 5, a signal from the computer 17 corresponding to the height of the flight vehicle above ground is applied to a flare-out computer 20 which generates a suitable signal for application to an autopilot 21. In response to the signal from the flare-out computer 20, the autopilot 21 adjusts the control surfaces of the air frame 22 of the flight vehicle to cause the flight vehicle to follow a desired flared-out path in its approach to ground. In conventional aircraft, the autopilot 21 need only alter the position of the elevator to effect this result.

Since the angle of the downwash measured by the downwash angle transducer 16 is a function of the height of the flight vehicle above ground, and since the path of the flight vehicle is determined by the position of the control surfaces of the air frame 22, the system of Fig. 5 is analogous to a closed loop servo system in which any deviation from the flight path established by the flare-out computer 20 immediately produces a rate of change in the angle of the downwash which varies from a downwash angle rate programmed in the flareout computer 20. The computer 20 and the autopilot 21 in turn effect a suitable readjustment of the control surfaces of the air frame 22. The dashed line 23 represents the portion of the closed loop servo system encompassing the ground plane and the height of the flight vehicle above ground.

Since it is well known to automatically control the position of the throttle in a flight vehicle as a function of the angle of attack during the landing approach to maintain a constant lift, the control system of Fig. 5 may be used in conjunction with an automatic throttle control system to mechanize completely the landing approach of a flight vehicle.

In Fig. 6, there is shown diagrammatically an aircraft in the course of a landing approach which illustrates a straight line glide path, the flare-out during the transition between the straight line glide path and the ground plane, and the runway. Where the automatic control system of Fig. 5 is employed to cause an aircraft to follow an optimum flared out path, the flight vehicle arrives above the runway in an optimum position for touchdown which may be accomplished either automatically or under the control of a pilot.

A detailed discussion of the optimum flared-out flight path in the land approach of an aircraft may be found in a graduate thesis entitled "Prediction of Landing Performances for High Speed Airplanes" by Norris Jay Hanks, submitted in August 1955, to the United States Air Force Institute of Technology, published by the Armed Services Technical Information Agency as AD 72651.

Figure 7:
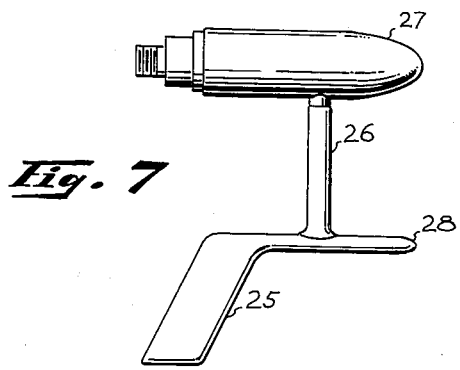
Fig. 7 is a side view of one type of device for sensing the angle of attack or the downwash angle associated with an aerodynamic surface.
Figure 8:
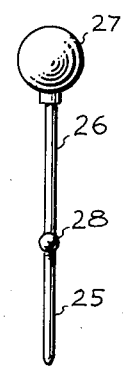
Fig. 8 is a front view of the device of Fig. 7.

Although any suitable mechanism may be employed in accordance with the invention for measuring the angle of attack and the downwash angle as described above, there is illustrated in Figs. 7 and 8 one suitable wind vane type device by means of which the direction of the air stream in a given location adjacent a flight vehicle may be determined. In the apparatus of Figs. 7 and 8, a vane 25 is rigidly supported on a rotatable shaft 26, journalled at one end in a housing 27 within which a conventional potentiometer or selsyn transmitter may be located. In flight, the vane 26 operates in a manner similar to a conventional weather vane to cause the nose 28 to point into the direction of the wind. Accordingly, the shaft 26 assumes a position representing the direction of the wind and by means of the aforesaid potentiometer or selsyn transmitter within the housing 27 there may be generated electrical signals representing the direction of the flow of air.

Figure 9:
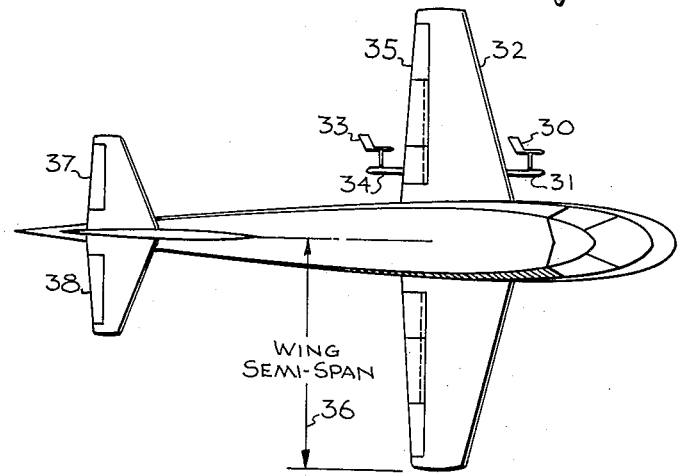
Fig. 9 is a top view of an aircraft equipped with transducers for sensing the angle of attack and the downwash angle.

The device of Figs. 7 and 8 may be used to measure both the angle of attack and the downwash angle in accordance with the present invention by mounting one such device forward of an aerodynamic surface of the flight vehicle and another such device trailing the aerodynamic surface of a flight vehicle. For example, in Fig. 9, there is shown a conventional aircraft in which one transducer 30 is mounted on an extension 31 forward of the trailing edge of an aerodynamic surface in the form of wing 32. Since the transducer 30 is capable of generating a signal representing the flow of air towards the wing 32, the signal from the transducer 30 represents the angle of attack of the wing 32. In a similar fashion, a second transducer 33 may be mounted on an extension 34 trailing the wing 32 to measure the flow of air and the downwash angle. As noted previously in connection with Fig. 5, where flaps are employed to alter the lift coefficient of an aircraft, the angle of downwash is affected by the position of the flaps. Accordingly, in the conventional aircraft of Fig. 9, the position of the flap 35 may be sensed by means of a conventional potentiometer which is linked to the flap adjustment mechanism for generating an electrical signal which may be utilized in conjunction with the electrical signals from the angle of attack transducer 30 and the downwash angle transducer 33 to determine the true altitude of the aircraft above ground. Since the ground effect upon the downwash angle appears only when the aircraft is in proximity to the ground at a distance of the order of a semi-span of the wing, there is drawn on the diagram of Fig. 9 a line 36 representing the maximum distance at which the altitude and flight control system of the invention is effective. Where the invention is employed in the specific arrangement of Fig. 5 to control the flare-out path of an aircraft such as that of Fig. 9, in its landing approach, the control surfaces such as the elevators 37 and 38 may be linked to the autopilot to cause the aircraft to follow the desired flight path. Should any malfunction occur in the flight control system of a manned aircraft, the system may be readily arranged in a conventional fashion to be subject to override by the pilot to effect a manually controlled landing operation.

Where the flight control system of the invention is employed in the automatic landing of aircraft in which the straight line glide path approach portion of the landing is a conventional ground controlled approach (GCA) or an instrument landing system (ILS), it is contemplated that safe and effective aircraft landings may be accomplished in extremely adverse weather conditions. In practice, conventional landing approaches allow the control of the aircraft down to elevations of the order of 50 feet, which elevation is of the order of the semi-span of relatively large types of known aircraft. Therefore, a completely controlled landing approach system utilizing the present invention in combination with known landing approach systems is feasible.

One particular advantage of the present invention is the relative simplicity of the altitude measuring system, compared with known systems for measuring relatively low altitudes which employ complex radiowave echo devices. Since in any aircraft control system reliability decreases as the complexity of the apparatus increases, the apparatus of the present invention affords a degree of reliability not heretofore obtainable. Further simplification of a landing approach system utilizing the invention as illustrated in Fig. 5 may be accomplished by applying the signal from the computer 17 directly to the autopilot 21 making the flare-out computer unnecessary. Since the downwash angle bears an exponential relationship to the altitude as illustrated in Fig. 2, and since the derivative of the angle of downwash with respect to the derivative of the angle of attack $$\left(\frac{d\epsilon}{d\alpha}\right)$$

also bears an exponential relationship to the altitude as indicated in Fig. 3, the signal derived from the computer 17 of Fig. 5 may be arranged to bear an exponential function of the height of the flight vehicle above ground. By referring to the flight path of Fig. 6, it is apparent that the flared-out path in the transition between a straight glide path and the runway is exponential so that in appropriate circumstances the signal from the computer 17 of Fig. 5 may be directly applied to an autopilot 21 to cause the flight vehicle to follow an exponential flared-out flight path.

Although the arrangements of Figs. 4 and 5 have been described within the frame of reference of airborne flight vehicles, it should be understood that the principles of the invention and the particular arrangements illustrated may be readily adapted for use in conjunction with vehicles moving through a fluid, as for example, a submarine or torpedo. Thus, the effects of the ground on the downwash angle of fluid trailing a hydrodynamic surface may be used to determine the height of the vehicle above the floor of a body of water or to determine the path of the vehicle through positioning of suitable control surfaces associated therewith.

By means of the above described invention, there is provided a simple, effective system for sensing an operational characteristic of a flight vehicle associated with changes in the downwash angle. Where such changes occur due to the proximity of the ground, the invention makes possible a new and improved altitude measuring and automatic landing approach system. Although other specific applications of the invention to control the path of a flight vehicle in accordance with changes in the downwash angle have been described herein, the invention should not be limited thereto. Accordingly, any and all modifications, alternative arrangements or equivalents falling with the annexed claims should be considered to be within the scope of the invention.

I claim:

1. A control system for a flight vehicle having at least one aerodynamic surface deflecting the flow of air in a downwash angle including the combination of means for sensing the angle of attack of a selected aerodynamic portion of said vehicle with respect to the direction of the flow of air relative to the path of the vehicle, means for sensing the downwash angle of the flow of air trailing the path of the selected aerodynamic portion of the vehicle and means coupled to both said angle of attack sensing means and said downwash angle sensing means for controlling the path of the flight vehicle as a function of changes occurring in the downwash angle.

2. A control system for a flight vehicle having at least one aerodynamic surface deflecting the flow of air in a downwash angle and control surfaces for controlling the path of the vehicle including the combination of a transducer mounted to trail a selected aerodynamic portion of said vehicle for sensing the downwash angle of the flow of air trailing the selected aerodynamic portion of the flight vehicle, energizing means for positioning the control surfaces of the flight vehicle, and means coupling the downwash angle sensing means to the energizing means for positioning the control surfaces of the vehicle in accordance with changes in the downwash angle sensed by the transducer.

3. A control system for a flight vehicle having at least one aerodynamic surface deflecting the flow of air in a downwash angle including the combination of a first transducer for sensing the angle of attack of a selected aerodynamic portion of the vehicle with respect to the direction of the flow of air relative to the path of the vehicle, a second transducer for sensing the downwash angle of the flow of air trailing the path of the selected aerodynamic portion of the vehicle, at least one control surface associated with the flight vehicle for controlling the flight path, and means coupled to both said first and said second transducers for positioning said control surface in accordance with the relationship between the angle of attack and the downwash angle whereby the flight vehicle follows a flight path determined at least in part by the relationship between the angle of attack and the downwash angle.

4. A flight vehicle control system for controlling the flight path of the vehicle as an exponential function of the altitude of the vehicle with respect to the ground including the combination of means for sensing the angle of attack of a selected aerodynamic portion of said vehicle with respect to the direction of the flow of air relative to the path of the vehicle, means for sensing the downwash angle of the flow of air trailing the path of the selected aerodynamic portion of the vehicle and means coupled to both said angle of attack sensing means and said downwash angle sensing means for controlling the path of the flight vehicle as an exponential function of changes occurring in the downwash angle.

5. A control system for a flight vehicle having at least one aerodynamic surface deflecting the flow of air in a downwash angle including the combination of at least one movable control surface associated with the flight vehicle for altering the flight path of the vehicle in accordance with the position of the control surface, means for sensing the angle of attack of a selected aerodynamic portion of said vehicle, means for sensing the downwash angle of the flow of air trailing an aerodynamic portion of the flight vehicle, and means coupled between both the angle of attack and downwash angle sensing means and the control surface for causing the flight vehicle to follow an exponential path determined at least in part by changes in the downwash angle.

6. A low altitude altimeter for use in determining the height of a flight vehicle having at least one aerodynamic surface deflecting the flow of air in a downwash angle with respect to ground including the combination of means for sensing the angle of attack of a selected aerodynamic portion of said vehicle with respect to the direction of the flow of air relative to the path of the vehicle, means for sensing the downwash angle of the flow of air trailing the path of the selected aerodynamic portion of the vehicle relative to the angle of attack, and means coupled to both said angle of attack sensing means and said downwash angle sensing means for comparing the angle of attack and the downwash angle to determine the altitude of the flight vehicle with respect to ground.

7. A low altitude altimeter for use in conjunction with a flight vehicle having at least one aerodynamic surface which passes through the air to produce a downwash of air in a direction determined in part by the proximity of the aerodynamic surface to the ground including the combination of a first transducer mounted forward of the leading edge of the aerodynamic surface for measuring the angle of attack of the aerodynamic surface with respect to the direction of the flow of air relative to the flight path of the vehicle, a second transducer mounted in a position trailing the aerodynamic surface for sensing the downwash angle of the flow of air trailing the path of the aerodynamic surface and means coupled to both of said transducers for generating a signal corresponding to the altitude of the flight vehicle above ground by means of a comparison between the angle of attack and the downwash angle.

8. A low altitude altimeter for use in conjunction with a flight vehicle having at least one aerodynamic surface which produces a downwash trailing the surface in its movement through the air, including the combination of means for sensing the angle of attack of the aerodynamic surface, means for sensing the downwash angle of the flow of air trailing the aerodynamic surface relative to the angle of attack, and means coupled to both said angle of attack sensing means and said downwash angle sensing means for deriving a signal representing the relationship $$\frac{d\epsilon}{d\alpha}$$

where $\alpha$ represents the angle of attack and $\epsilon$ represents the downwash angle, whereby a signal is produced by the signal deriving means representing a function of the altitude of the flight vehicle above ground.

9. An altitude measuring system for use in supplying information to an autopilot during the flare-out phase in the landing of a flight vehicle including the combination of means for sensing the angle of attack of a selected aerodynamic portion of a flight vehicle, means for sensing changes in the downwash angle of the flow of air trailing the path of a substantially horizontal aerodynamic portion of the vehicle appearing as the vehicle approaches the ground, and means coupled to both said angle of attack sensing means and said downwash angle sensing means for deriving information representing the altitude of the flight vehicle above ground for use by an autopilot in establishing an optimum flight path during the flare-out phase of the landing approach.

10. A control system for use in conjunction with a flight vehicle having at least one aerodynamic surface which passes through the air to produce a trailing downwash of air in a direction which bears a relationship to the proximity of the flight vehicle with respect to ground including the combination of a first transducer for generating an electrical signal representing the angle of attack of the aerodynamic surface, a second transducer for generating an electrical signal representing the angle of the downwash trailing the aerodynamic surface relative to the angle of attack, an autopilot for controlling the flight path of the flight vehicle, and means applying the electrical signals from the first and second transducers to the autopilot for causing the flight vehicle to follow an exponential flight path as it approaches the ground.

11. A control system for use in conjunction with a flight vehicle having at least one aerodynamic surface which produces a downwash of air trailing the surface in a direction dependent upon the proximity of the flight vehicle to ground including the combination of a first transducer for generating an electrical signal representing the angle of attack of the aerodynamic surface, a second transducer trailing the aerodynamic surface for generating an electrical signal representing the direction of the flow of air trailing the path of the aerodynamic surface, a computer coupled to the first and second transducers for generating an electrical signal which is a function of the altitude of the flight vehicle above ground, and an autopilot coupled to the computer for controlling the flight path of the flight vehicle in response to the signal from the computer whereby the flight vehicle follows a flared-out path in its approach to ground.

12. A control system in accordance with claim 11 for use in conjunction with a flight vehicle in which at least one aerodynamic surface includes a flap for altering the lift coefficient of the aerodynamic surface, means for generating an electrical signal in accordance with the position of the flap coupled to the computer, said computer being adapted to generate an electrical signal based upon a comparison of the signals from the first and second transducers and the flap signal generating means whereby an electrical signal is applied to the autopilot representing the altitude of the flight vehicle above ground irrespective of the position of the flap associated with the aerodynamic surface.

13. A control system for use in conjunction with a flight vehicle having at least one aerodynamic surface which produces a downwash of air trailing the surface in a direction dependent upon the proximity of the flight vehicle to ground including the combination of a first transducer for generating an electrical signal representing the angle of attack of the aerodynamic surface, a second transducer trailing the aerodynamic surface for generating an electrical signal representing the downwash angle of air trailing the path of the aerodynamic surface, a computer coupled to the first and second transducers for generating an electrical signal representing the derivative of the downwash angle with respect to the angle of attack, and an autopilot coupled to the computer for controlling the flight path of the flight vehicle in response to the signal from the computer whereby the flight vehicle follows a flared-out path in its approach to ground.

14. A control system for a fluid traveling vehicle having at least one surface deflecting the flow of fluid in a downwash angle including the combination of means for sensing the angle of attack of a selected portion of said vehicle with respect to the direction of the flow of fluid relative to the path of the vehicle, means for sensing the downwash angle of the flow of fluid trailing the path of the selected portion of the vehicle and means coupled to both said angle of attack sensing means and said downwash angle sensing means for controlling the path of the vehicle as a function of changes occurring in the downwash angle.

15. A control system for use in conjunction with a fluid traveling vehicle having at least one surface deflecting the flow of fluid in a downwash angle including the combination of a first transducer for generating an electrical signal representing the angle of attack of the surface, a second transducer for generating an electrical signal representing the angle of the downwash trailing the surface relative to the angle of attack, automatic means for controlling the path of the vehicle through the fluid, and means applying the electrical signals from the first and second transducers to said controlling means for causing the vehicle to follow a path controlled at least in part by said first and second transducers.

16. A low level elevation measuring device for use in conjunction with a fluid traveling vehicle having at least one surface which passes through the fluid to produce a downwash of fluid in a direction determined in part by the proximity of the surface to the ground including the combination of a first transducer mounted forward of the leading edge of the surface for measuring the angle of attack of the surface with respect to the direction of the flow of fluid relative to the path of the vehicle, a second transducer mounted in a position trailing the surface for sensing the downwash angle of the flow of fluid trailing the path of the surface, and means coupled to both of said transducers for generating a signal corresponding to the elevation of the vehicle above ground by means of a comparison between the angle of attack and the downwash angle.

References Cited in the file of this patent

UNITED STATES PATENTS

| | | |
|---|---|---|
| 2,575,532 | Sears | Nov. 20, 1951 |
| 2,939,652 | Hobley | June 7, 1960 |